United States Patent  
Wang et al.

(10) Patent No.: US 10,383,076 B2  
(45) Date of Patent: Aug. 13, 2019

(54) METHODS USED IN RADIO NODES AND ASSOCIATED RADIO NODES

(71) Applicant: Telefonaktiebolaget LM Ericsson (publ), Stockholm (SE)

(72) Inventors: Hai Wang, Beijing (CN); Qianxi Lu, Beijing (CN); Rui Fan, Beijing (CN); Jinhua Liu, Beijing (CN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 84 days.

(21) Appl. No.: 15/564,913

(22) PCT Filed: Apr. 30, 2015

(86) PCT No.: PCT/CN2015/077978  
§ 371 (c)(1),  
(2) Date: Oct. 6, 2017

(87) PCT Pub. No.: WO2016/172925  
PCT Pub. Date: Nov. 3, 2016

(65) Prior Publication Data  
US 2018/0098296 A1    Apr. 5, 2018

(51) Int. Cl.  
*H04W 56/00*    (2009.01)

(52) U.S. Cl.  
CPC ....... *H04W 56/0015* (2013.01); *H04W 56/00* (2013.01); *H04W 56/004* (2013.01); *H04W 56/006* (2013.01); *H04W 56/007* (2013.01)

(58) Field of Classification Search  
None  
See application file for complete search history.

(56) References Cited

U.S. PATENT DOCUMENTS

2004/0174845 A1    9/2004    Koo et al.  
2007/0076668 A1    4/2007    Tirkkonen et al.  
(Continued)

FOREIGN PATENT DOCUMENTS

| CN | 101690354 A | 3/2010 |
| CN | 102740446 A | 10/2012 |
| JP | 2006515731 A | 6/2006 |
| JP | 2011142659 A | 7/2011 |
| JP | 2014123978 A | 7/2014 |
| WO | 2014137781 A2 | 9/2014 |

OTHER PUBLICATIONS

"ETSI TR 136 922 V12.0.0", LTE; Evolved Universal Terrestrial Radio Access (E-UTRA); TDD Home eNode B (HeNB) Radio Frequency (RF) requirements analysis (3GPP TR 36.922 version 12.0.0 Release 12), Oct. 2014, pp. 1-76.  
(Continued)

*Primary Examiner* — Brian S Roberts  
(74) *Attorney, Agent, or Firm* — Sage Patent Group

(57) ABSTRACT

The present disclosure relates to a method used in a radio node, and an associated radio node. The radio node is served by a superior radio node and serves one or more subordinate radio nodes. The method includes: receiving a first synchronization signal from the superior radio node; obtaining a first downlink transmission time position for the first synchronization signal; determining a second downlink transmission time position for a second synchronization signal to be transmitted by the radio node, based on the first downlink transmission time position; and transmitting the second synchronization signal via the second downlink transmission time position to the one or more subordinate radio nodes.

14 Claims, 7 Drawing Sheets

(56) References Cited

U.S. PATENT DOCUMENTS

| | | | |
|---|---|---|---|
| 2007/0087691 A1 | 4/2007 | Lee et al. | |
| 2010/0260169 A1 | 10/2010 | Gheorghiu et al. | |
| 2014/0334399 A1 | 11/2014 | Xu et al. | |
| 2015/0124579 A1* | 5/2015 | Sartori | H04J 11/00 370/210 |
| 2015/0264588 A1* | 9/2015 | Li | H04W 56/0015 370/350 |
| 2016/0044618 A1* | 2/2016 | Sheng | H04W 56/002 370/329 |
| 2017/0070968 A1* | 3/2017 | Kim | H04L 27/2613 |

OTHER PUBLICATIONS

Zou, Kingsley Jun, et al., "Network Synchronization for Dense Small Cell Networks", IEEE Wireless Communications, Apr. 2015, pp. 108-117.

"Discussion on resource allocation for D2D synchronization", 3GPP TSG RAN WG1 Meeting #78; R1-143188; Dresden, Germany, Aug. 18-22, 2014, pp. 1-4.

"Resource Allocation for Synchronization Signal and Channel", 3GPP TSG-RAN WG1 #78; R1-143141; Dresden, Germany, Aug. 18-22, 2014, pp. 1-5.

"Synchronization for D2D Discovery", 3GPP TSG RAN WG1 Meeting #76bis; R1-141432; Shenzhen, China, Mar. 31-Apr. 4, 2014, pp. 1-4.

"Synchronization Signals and Channel Design for D2D Discovery and Communication", 3GPP TSG RAN WG1 Meeting #76, R1-140774, Ericsson, Prague, Czech Republic, Feb. 10-14, 2014, pp. 1-7.

3GPP, "3rd Generation Partnership Project; Technical Specification Group Radio Access Network; Evolved Universal Terrestrial Radio Access (E-UTRA); Physical Channels and Modulation (Release 10)", 3GPP TS 36.211 V10.3.0, Sep. 2011, 1-103.

3GPP, "3rd Generation Partnership Project; Technical Specification Group Radio Access Network; Evolved Universal Terrestrial Radio Access (E-UTRA); TDD Home eNode B (HeNB) Radio Frequency (RF) requirements analysis (Release 11)", 3GPP TR 36.922 V11.0.0, Sep. 2012, 1-74.

* cited by examiner

Limited region of sync signal

Limited region of sync signal

The region for UE to search for neighboring AN sync signal

The region for UE to search for neighboring AN sync signal

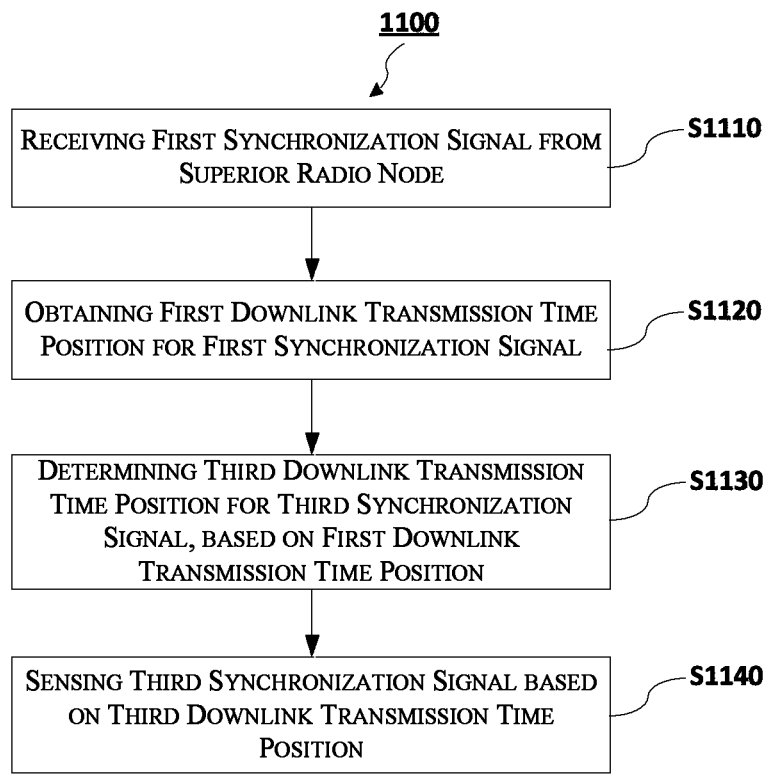
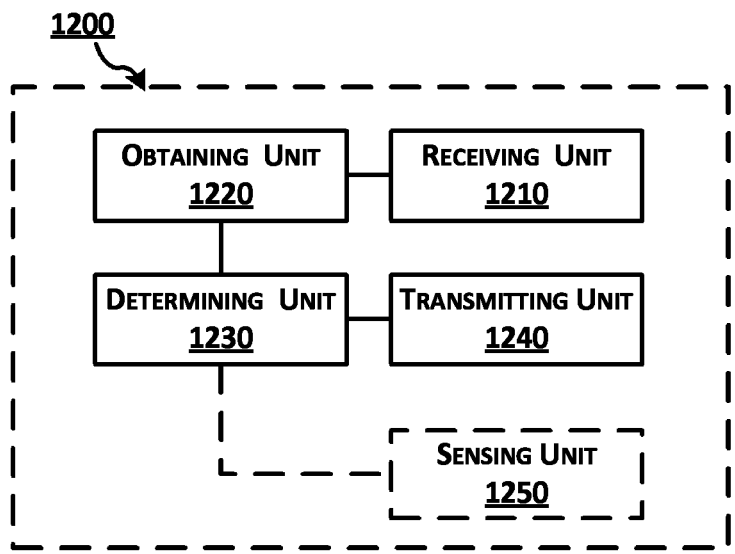

METHODS USED IN RADIO NODES AND ASSOCIATED RADIO NODES

TECHNICAL FIELD

The technology presented in this disclosure generally relates to radio communication networks. More particularly, the present disclosure relates to methods used in a radio node, and an associated radio node.

BACKGROUND

This section is intended to provide a background to the various embodiments of the technology described in this disclosure. The description in this section may include concepts that could be pursued, but are not necessarily ones that have been previously conceived or pursued. Therefore, unless otherwise indicated herein, what is described in this section is not prior art to the description and/or claims of this disclosure and is not admitted to be prior art by the mere inclusion in this section.

A UE wishing to access any cellular cell must first undertake a cell search procedure. This consists of a series of synchronization stages by which the UE determines time and frequency parameters that are necessary to demodulate the DownLink (DL) and to transmit UpLink (UL) signals with the correct timing.

The 3GPP specifications for Long Term Evolution (LTE) (e.g., 3GPP TS 36.211, E-UTRA Physical Channels and Modulation, v10.3.0, 2011/09) specify details for physical layers, where some DL signal transmission is mandatory, e.g., synchronization signal, with fixed and known timing/periodicity/frequency position, in order for initial User Equipment (UE) access. Specifically, to assist the cell search, two special signals are transmitted on each downlink component carrier: the Primary Synchronization Signal (PSS) and the Secondary Synchronization Signal (SSS). Although having the similar detailed structure, the time-domain positions of the synchronization signals within the frame differ somewhat depending on whether the cell is operating in Frequency Division Duplexing (FDD) or Time Division Duplexing (TDD).

FIG. 1 schematically illustrates synchronization signal positions in case of FDD and TDD, respectively (referring to 3GPP TS 36.211, E-UTRA Physical Channels and Modulation, v10.3.0, 2011/09). As shown in the upper part of FIG. 1, in the case of FDD, the PSS is transmitted within the last symbol of the first slot of subframes 0 and 5, while the SSS is transmitted within the second last symbol of the same slot, i.e., just prior to the PSS. In the case of TDD (the lower part of FIG. 1), the PSS is transmitted within the third symbol of subframes 1 and 6, i.e., within the Downlink Pilot Time Slot (DwPTS), while the SSS is transmitted in the last symbol of subframes 0 and 5, that is, three symbols ahead of the PSS.

With the ever increasing demands from networked society, either on huge traffic volume or very low latency, LTE needs to be continuously evolved to meet such demands. Due to scarcity of frequency spectrum, the available frequencies for LTE would be quite probably in the range of 10 GHz to 30 GHz. At such high frequencies, the traditional LTE technology faces great challenge, and a new technology need be to designed, which may be referred to as LTE-Next (LTE-NX).

FIG. 2 schematically shows one example LTE-NX network. As shown in FIG. 2, there is a network node called as Central Control Unit (CCU), which is responsible for parameter configurations and coordination among Access Nodes (ANs) (also called as Access Point (AP)), e.g., AN1, AN2, AN3, and AN4. Each AN may e.g., be a wireless device, a mobile wireless terminal or a wireless terminal, a mobile phone, a computer such as a laptop, a Personal Digital Assistants (PDAs) or a tablet computer, sometimes referred to as a phablet, with wireless capability (the foregoing ones may be collectively known as a UE), a sensor or actuator with wireless capabilities or any other radio network units capable to communicate over a radio link in a wireless communication network. It should be noted that the term AN used in this document also covers other wireless devices such as Machine to Machine (M2M) devices, also denoted Machine Type Communication (MTC) devices. For simplification, an AN may be uniformly referred to as a radio node hereafter.

The major difference between LTE-NX and LTE is that LTE-NX scales LTE n times in frequency domain and 1/n times in time domain. Besides, due to variation of traffic, LTE-NX supports flexible duplex, which means the direction of almost every subframe can be either DL or UL. Furthermore, LTE-NX will be densely deployed, which means self-backhauling is a very important feature to be considered. This might lead to self-interference problems for synchronization (sync) signal transmission.

3GPP has introduced a concept of synchronization stratum for home evolved Node B (Home eNB, also called as HeNB for simplicity), in the case of multi-hop synchronization. The synchronization stratum of a particular HeNB is defined as the smallest number of hops between the HeNB and the Global Positioning System (GPS) source. It should be noted that the synchronization stratum of a particular HeNB is one greater than its donor (H)eNB, i.e., the (H)eNB that it is tracking.

FIG. 3 illustrates a typical multi-hop synchronization scenario in which the concept of synchronization stratum is involved.

The left part of FIG. 3 illustrates a single hop synchronization for HeNB1, which is a common case under good macro coverage. But when a HeNB cannot acquire synchronization from sync eNB, multiple hops could be supported. The right part of FIG. 3 illustrates a concept where HeNB2 acquires synchronization from HeNB1 which in turn acquires synchronization from sync eNB. In such a kind of scenario, sync eNB has stratum level 0, HeNB1 has stratum level 1 and HeNB2 has stratum level 2. That is, sync eNB has a higher stratum level than HeNB 1, and HeNB 1 has a higher stratum level than HeNB 2. In other words, sync eNB is a superior node of HeNB 1 and HeNB 1 is a subordinate node of sync eNB, and HeNB 1 is a superior node of HeNB 2 and HeNB 2 is a subordinate node of HeNB 1.

Such a concept of synchronization stratum may be also applied in LTE-NX. In practice, one AN in LTE-NX may serve multiple links. For example, as shown in FIG. 2, AN 2 may access to AN 1 while serving AN 4. That is, AN 1 may have a higher stratum level than AN 2, and AN 2 has a higher stratum level than AN 4. In this case, with the fixed synchronization signal arrangements as shown in FIG. 1, AN 2 might receive a sync signal from AN 1 and transmit a sync signal to AN 4 at the same timing. This would lead to self-interference.

Moreover, according to the typical LTE technology, sync signal positions are periodically distributed over the time domain. That is, with such sync signal transmissions, any AN in LTE-NX has to monitor for a long time period, in order to perform cell search or cell reselection.

SUMMARY

It is therefore an object of embodiments herein to coordinate synchronization signal transmission timings among several radio nodes.

According to a first aspect of the present disclosure, there is proposed a method used in a radio node. The radio node is served by a superior radio node and serves one or more subordinate radio nodes. The method includes: receiving a first synchronization signal from the superior radio node; obtaining a first downlink transmission time position for the first synchronization signal; determining a second downlink transmission time position for a second synchronization signal to be transmitted by the radio node, based on the first downlink transmission time position; and transmitting the second synchronization signal via the second downlink transmission time position to the one or more subordinate radio nodes.

According to a second aspect of the present disclosure, there is proposed a method used in a radio node. The radio node is served by a superior radio node having one or more neighboring radio nodes. The method includes: receiving a first synchronization signal from the superior radio node; obtaining a first downlink transmission time position for the first synchronization signal; determining a third downlink transmission time position for a third synchronization signal to be transmitted from one of the one or more neighboring radio nodes, based on the first downlink transmission time position; and sensing the third synchronization signal based on the third downlink transmission time position.

According to a third aspect of the present disclosure, there is proposed a radio node. The radio node is served by a superior radio node and serves one or more subordinate radio nodes. The radio node includes: a receiving unit configured to receive a first synchronization signal from the superior radio node; an obtaining unit configured to obtain a first downlink transmission time position for the first synchronization signal; a determining unit configured to determine a second downlink transmission time position for a second synchronization signal to be transmitted by the radio node, based on the first downlink transmission time position; and a transmitting unit configured to transmit the second synchronization signal via the second downlink transmission time position to the one or more subordinate radio nodes.

According to a fourth aspect of the present disclosure, there is proposed a radio node. The radio node is served by a superior radio node having one or more neighboring radio nodes. The radio node includes: a receiving unit configured to receive a first synchronization signal from the superior radio node; an obtaining unit configured to obtain a first downlink transmission time position for the first synchronization signal; a determining unit configured to determine a third downlink transmission time position for a third synchronization signal to be transmitted from one of the one or more neighboring radio nodes, based on the first downlink transmission time position; and a sensing unit configured to sense the third synchronization signal based on the third downlink transmission time position.

According to fifth aspect of the present disclosure, there is proposed a computer-readable storage medium storing instructions thereon. The instructions when executed, cause one or more computing devices to perform the method according to the first or second aspect.

According to the present disclosure, for a radio node in a middle stratum level of a wireless communication system, which is served by a superior radio node and serves one or more subordinate radio nodes, it can determine a transmission time position for its synchronization signal by receiving its superior radio node's synchronization signal. Furthermore, such a radio node can also sense synchronization signals to be transmitted from one or more neighboring radio nodes of its superior radio node by determining its transmission time position based on the superior radio node's synchronization signal. This distributes resources for synchronization signal transmission within a limited resource range, thereby avoiding self-interference and reducing operation complexity in e.g., cell search or cell reselection.

BRIEF DESCRIPTION OF THE DRAWINGS

The foregoing and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings.

FIG. 11 is a flowchart of a method 1100 used in a radio node according to an embodiment of the present disclosure.

FIG. 12 is a schematic block diagram of a radio node 1200 according to an embodiment of the present disclosure.

DETAILED DESCRIPTION OF EMBODIMENTS

Figure 1:
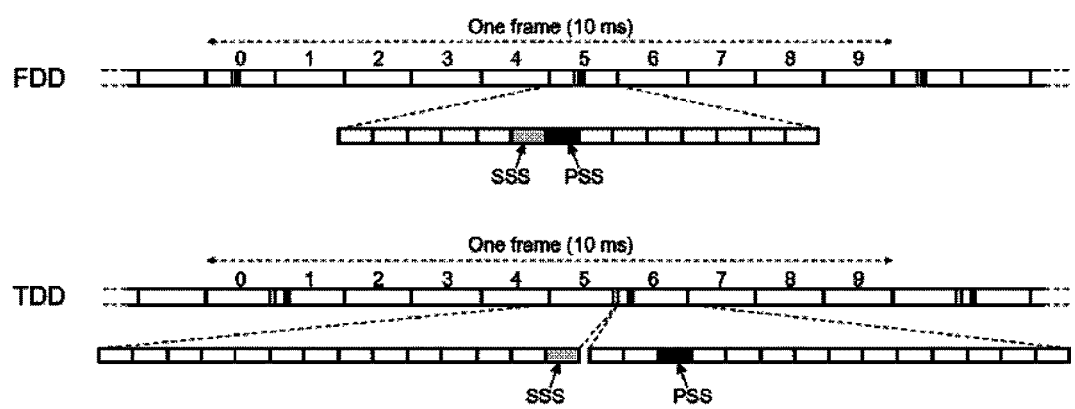
FIG. 1 schematically illustrates synchronization signal positions in case of FDD and TDD, respectively.
Figure 2:
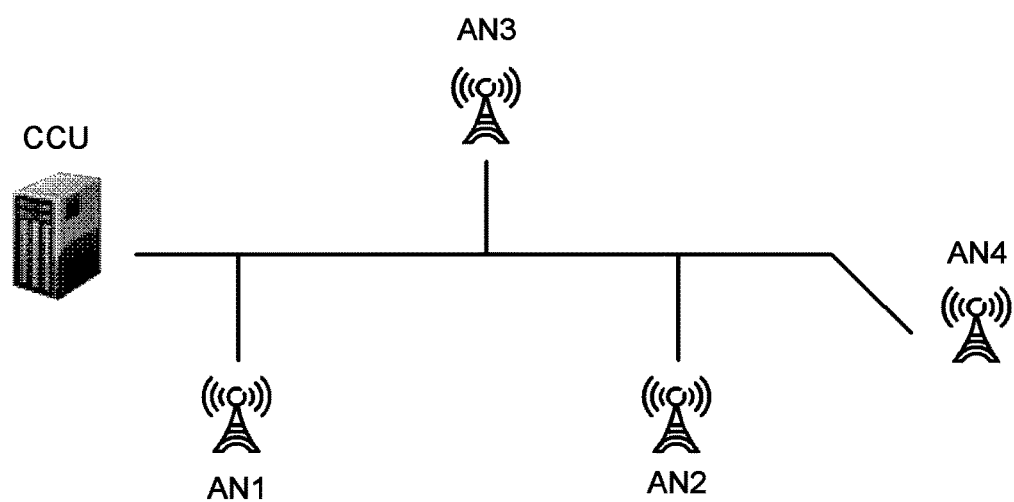
FIG. 2 schematically shows one example LTE-NX network.

In the following detailed description, reference is made to the accompanying drawings, which form a part hereof. In the drawings, similar symbols typically identify similar components, unless context dictates otherwise. The illustrative examples or embodiments described in the detailed description, drawings, and claims are not meant to be limiting. Other examples or embodiments may be utilized, and other changes may be made, without departing from the spirit or scope of the subject matter presented here. It will be readily understood that aspects of this disclosure, as generally described herein, and illustrated in the figures, can be arranged, substituted, combined, and designed in a wide variety of different configurations, all of which are explicitly contemplated and make part of this disclosure.

Figure 3:
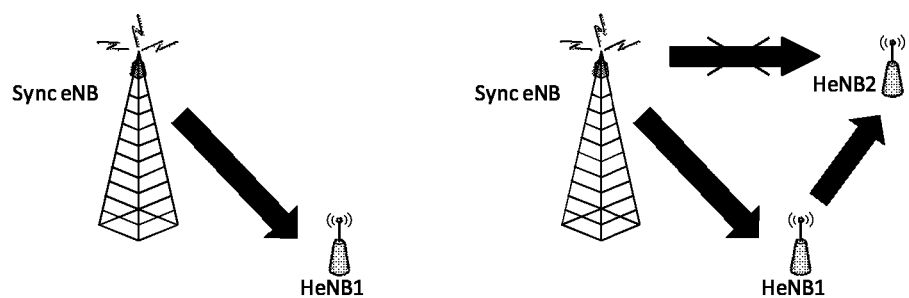
FIG. 3 illustrates a typical multi-hop synchronization scenario in which the concept of synchronization stratum is involved.
Figure 4:
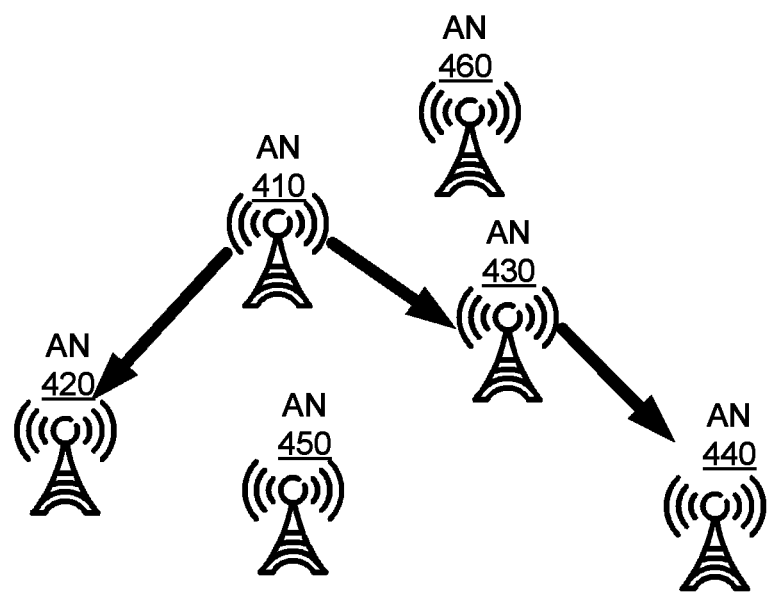
FIG. 4 depicts an example of a wireless communication system in which the present disclosure may be implemented.

FIG. 4 depicts an example of a wireless communication system in which the present disclosure may be implemented. The wireless communication network utilizes the concept of synchronization stratum as shown in FIG. 3.

As shown in FIG. 4, the wireless communication system involves a plurality of network access nodes (ANs) whereof six ANs are depicted in FIG. 4. The wireless communication system may e.g., be a LTE system, a LTE-NX system, or any other appropriate system utilizing the multi-hip concept as shown in FIG. 3.

In this example, the six ANs are exemplified as AN 410, AN 420, AN 430, AN 440, AN 450, and AN 460. AN 410, AN 450, and AN 460 are three neighboring ANs, and all have stratum level 0. AN 420 and AN 430 both have stratum level 1, and AN 440 has stratum level 2. As illustrated, AN 410 is a superior radio node (or serving radio node) of AN 420 and AN 430, and AN 430 is a superior radio node (or serving radio node) of AN 440. For example, AN 440 may be a UE served by AN 430. It is also possible that AN 430 itself acts as a UE served by AN 410, and the UE acts as a hot spot serving other UEs (e.g., AN 440).

The present disclosure proposes to coordinate synchronization signal transmission timings among several radio nodes, e.g., ANs 410-460.

Figure 5:
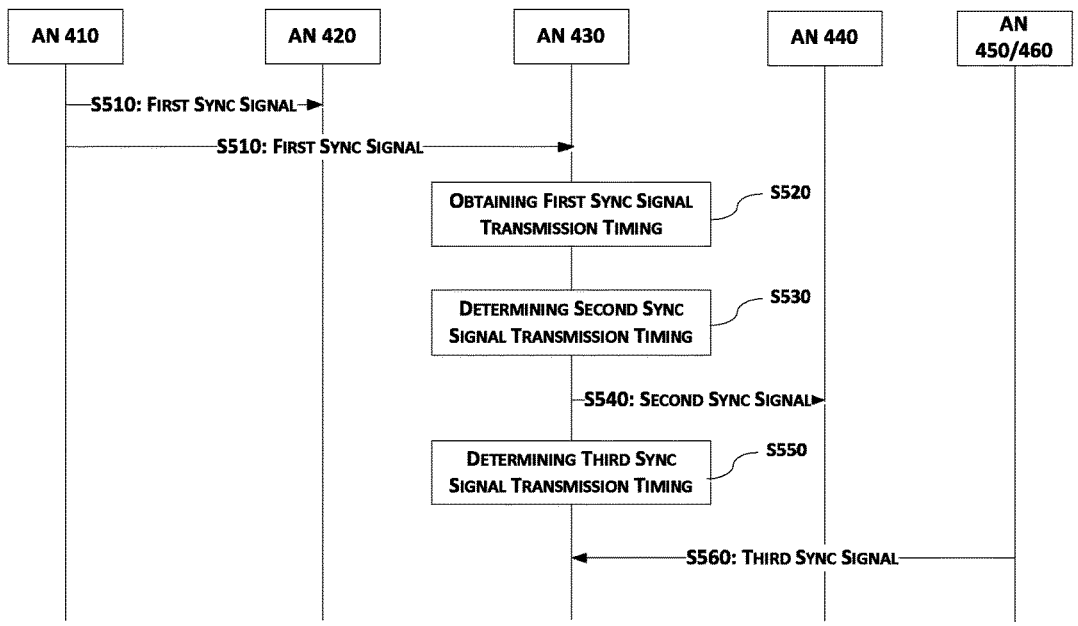
FIG. 5 illustrates a flow sequence of a process according to an embodiment of the present disclosure.

FIG. 5 illustrates a flow sequence of a process according to an embodiment of the present disclosure, which may be used in the wireless communication system as shown in FIG. 4. It is assumed that all of AN 420, AN 430 and AN 440 here are in sync search stage, in which each one would look for sync signal for synchronization during cell search or cell reselection. The synchronization stage would be completed after a sync signal is obtained from a serving radio node or superior radio node. For AN 420 and AN 430, AN 410 may be their serving radio node or superior radio node, and for AN 440, it is AN 430. That is, there is only one stratum level (i.e., one hop) between a radio node and its serving radio node.

As shown in FIG. 5, as an originator, AN 410 transmits a first sync signal to AN 420 and 430 at step S510. After receiving the first sync signal from AN 410, AN 420 or AN 430 would complete respective synchronization and then DL synchronization is established between AN 410 (the superior and upper level node) and AN 420 or AN 430.

At step S520, AN 430 obtains a first DL transmission time position (also called as transmission timing) for the first sync signal.

At step S530, AN 430 determines a second DL transmission time position for a second sync signal to be transmitted by AN 430, based on the first DL transmission time position.

At step S540, AN 430 transmits the second sync signal via the second DL transmission time position to AN 440.

For AN 430, it may receive the first sync signal from AN 410 and transmits the second sync signal to AN 440 in a same time position. This would lead to self-interference problems as discussed above. In view of this, there should be a first predetermined interval between the first DL transmission time position and the second DL transmission time position, so as to stagger the receiving of the first sync signal from the transmitting of the second sync signal. That is, there is a predefined mapping (i.e., offset) between the first and second DL transmission time positions.

Figure 6:
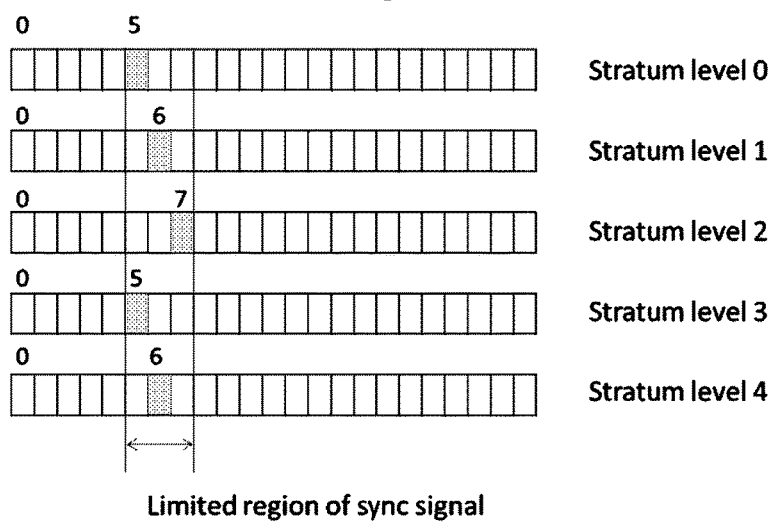
FIG. 6 shows an example of a predefined mapping between the first and second DL transmission positions according to an embodiment of the present disclosure.

FIG. 6 shows an example of a predefined mapping between the first and second DL transmission positions according to an embodiment of the present disclosure. First of all, it is assumed that five subframe structures as shown in this figure are aligned in time.

As shown in FIG. 6, the first DL transmission time position is subframe 5, and the second DL transmission time position is subframe 6. That is, there is a predefined offset, i.e., one subframe, between the first and second DL transmission time positions. In this case, AN 410 transmits the first sync signal to AN 430 on subframe 5. Upon receipt of the first sync signal from AN 410, AN 430 derives the second DL transmission time position as subframe 6, based on the predefined mapping as shown in FIG. 6. Then, AN 430 may transmit the second sync signal to AN 440 on subframe 6. In this manner, AN 430 can stagger the receiving of the first sync signal and the transmitting of the second sync signal, thereby avoiding self-interference problems.

The similar mapping may be applied to AN 430 and its subordinate ANs. For example, AN 440 may receive the second sync signal on subframe 6, and then derive subframe 7 for transmitting a fourth sync signal to its subordinate ANs.

In order to facilitate cell search or cell reselection, the present disclosure proposes to limit transmission of sync signals within a limited region, e.g., three subframes as shown in FIG. 6. To be specific, stratum levels 0 to 2 are configured with subframe 5, subframe 6 and subframe 7 respectively, and the same for the next three stratum levels. That is, a recursive sync signal arrangement is applied according to the present disclosure. Then, each radio node may need to search only within a small range of subframes (3 in the example of FIG. 6) for its target superior radio node during cell search or cell reselection.

Figure 7:
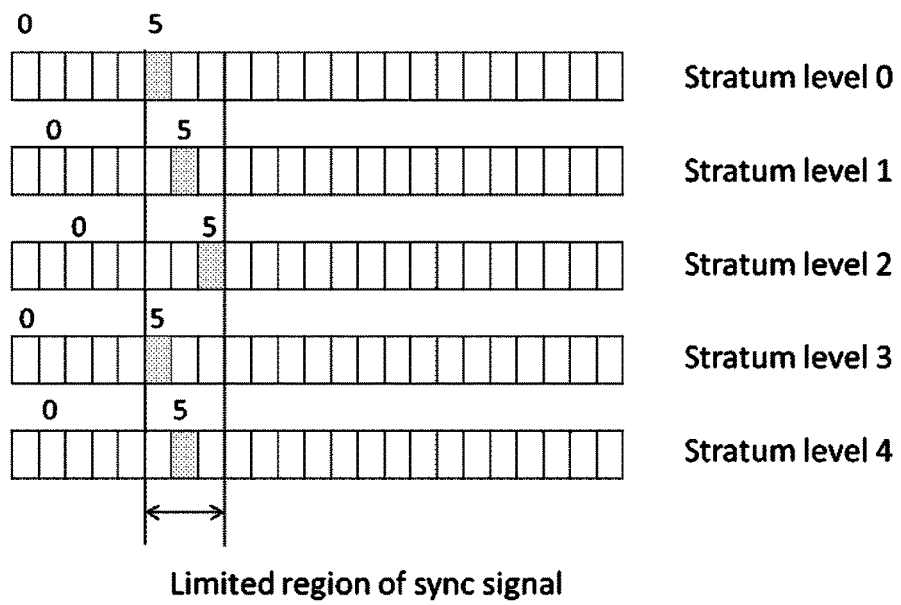
FIG. 7 shows another example of a predefined mapping between the first and second DL transmission positions according to an embodiment of the present disclosure.

FIG. 7 shows another example of a predefined mapping between the first and second DL transmission positions according to an embodiment of the present disclosure. First of all, it is assumed that five subframe structures as shown in this figure are aligned in time.

This example also limits transmission of sync signals within a limited region. The main difference from the example of FIG. 6 lies in that a radio node of each stratum level transmits its sync signals at a fixed subframe number, e.g., subframe 5 as shown in FIG. 7, and the predefined offset is made by adjusting a system subframe number of each stratum level, that is, system subframe number of different stratum levels are not aligned with each other. Rather, in the example of FIG. 6, DL synch signal position occurs at various subframe numbers, but system subframe number of different stratum levels are aligned with each other so as to make a predefined offset among these stratum levels. It should be appreciated that other appropriate mapping between the first and second DL transmission positions may be applicable as long as a predefined interval could be configured therebetween.

In another embodiment, AN 430 needs to perform cell search or cell reselection (also called as AN search or AN reselection here), e.g., AN 430 acts as a UE served by AN 410 or AN 430 needs to access to another AN, AN 430 may use the obtained first DL transmission time position to determine a third DL transmission time position for a third sync signal to be transmitted from a neighboring AN of AN 410 (step S550), and then sense the third sync signal based on the third DL transmission time position (step S560). In this way, AN 430 may track neighboring ANs of AN 410, thereby facilitating cell search or cell reselection and the like.

Figure 8:
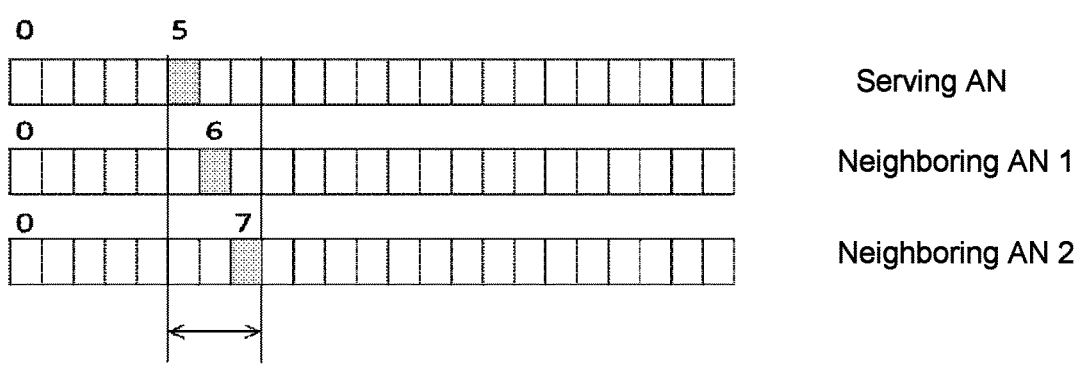
FIG. 8 shows an example of a predefined mapping between the first and third DL transmission positions according to an embodiment of the present disclosure.

FIG. 8 shows an example of a predefined mapping between the first and third DL transmission positions according to an embodiment of the present disclosure.

As shown in FIG. 8, the first DL transmission time position is subframe 5, and the third DL transmission time position is subframe 6. That is, there is a predefined offset, i.e., one subframe or two subframes, between the first and third DL transmission time positions. In this case, AN 410 transmits the first sync signal to AN 430 on subframe 5. Upon receipt of the first sync signal from AN 410, AN 430 derives the third DL transmission time position as subframe 6, based on the predefined mapping as shown in FIG. 8. Then, AN 430 may sense the third sync signal to be transmitted from AN 450 on subframe 6, and sense the third sync signal to be transmitting from AN 460 on subframe 7. Of course, such a sync signal arrangement may be recursively applied to a radio node of any stratum level.

In order to facilitate cell search, the present disclosure proposes to limit transmission of sync signals from AN 410 and its neighboring ANs within a limited region, e.g., three subframes as shown in FIG. 8. Then, each radio node may need to search within at most three subframes for its target superior radio node during handover or cell reselection. For example, when serving as a UE, AN 440 would know where to receive sync signals from neighboring ANs of its serving AN, i.e., AN 410.

Figure 9:
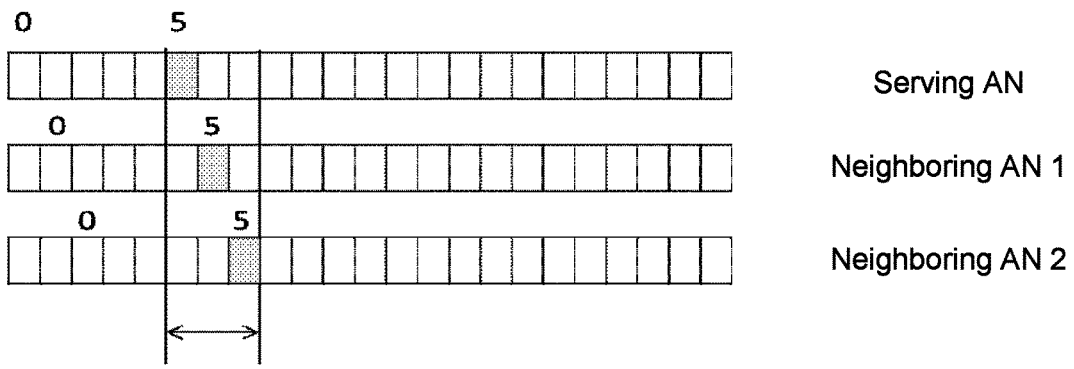
FIG. 9 shows another example of a predefined mapping between the first and third DL transmission positions according to an embodiment of the present disclosure.

FIG. 9 shows another example of a predefined mapping between the first and third DL transmission positions according to an embodiment of the present disclosure.

This example also limits transmission of sync signals within a limited region. The main difference from the example of FIG. 8 lies in that a radio node of each stratum level transmits its sync signals on the same subframe, e.g., subframe 5 as shown in FIG. 9, and the predefined offset is made by adjusting a starting subframe for each of AN 410 and its neighboring ANs. It should be appreciated that other appropriate mapping between the first and third DL transmission positions may be applicable as long as a predefined interval could be configured therebetween.

Figure 10:
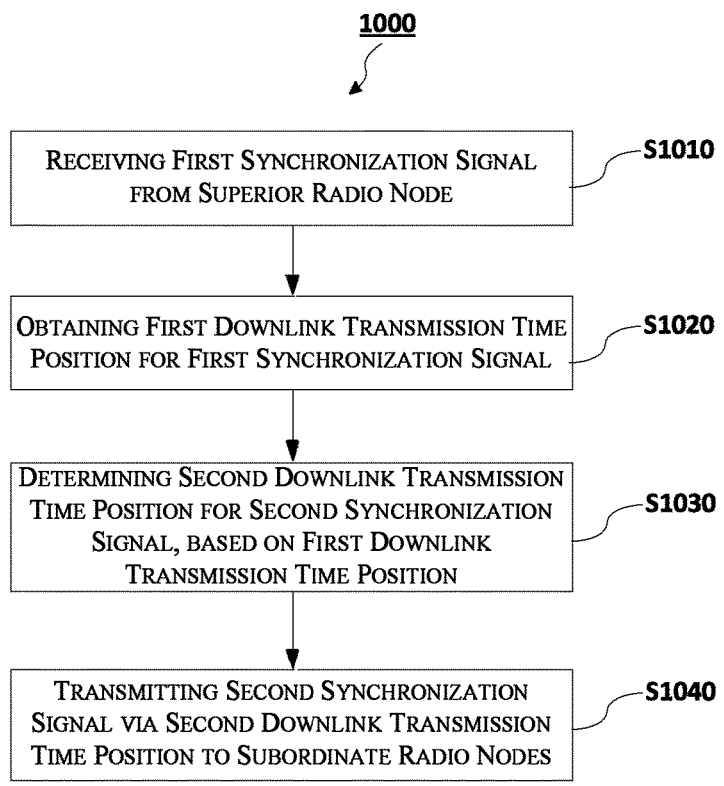
FIG. 10 is a flowchart of a method 1000 used in a radio node according to an embodiment of the present disclosure.

FIG. 10 is a flowchart of a method 1000 used in a radio node according to an embodiment of the present disclosure. The radio node is served by a superior radio node and serves one or more subordinate radio nodes. For example, the radio node may be AN 430, its superior radio node or serving radio node is AN 410, and AN 440 is a subordinate radio node of AN 430.

At step S1010, the radio node receives a first synchronization signal from the superior radio node.

At step S1020, the radio node obtains a first downlink transmission time position for the first synchronization signal.

At step S1030, the radio node determines a second downlink transmission time position for a second synchronization signal to be transmitted by the radio node, based on the first downlink transmission time position.

There is a first predetermined interval between the first downlink transmission time position and the second downlink transmission time position, e.g., as shown in FIG. 6 or 7. For example, the superior radio node is of stratum level 0 or 3, and the radio node is of stratum level 2 or 4. In this example, the first downlink transmission time position is subframe 5, and the second downlink transmission time position is determined as subframe 6, as shown in FIG. 6.

At step S1040, the radio node transmits the second synchronization signal via the second downlink transmission time position to the one or more subordinate radio nodes.

In an implementation, the radio node is, e.g., a UE serving as a hot spot, i.e., that can serve other UEs, or the radio node needs to access to another radio node. That is, the radio node needs to change its serving radio node, e.g., during cell search or cell reselection. In this case, the method 1000 further includes (not shown) determining a third downlink transmission time position for a third synchronization signal to be transmitted from one neighboring radio node of the superior radio node, based on the first downlink transmission time position; and sensing the third synchronization signal based on the third downlink transmission time position. There is a second predetermined interval between the first downlink transmission time position and the third downlink transmission time position, e.g., as shown in FIG. 8 or 9. To be specific, taking FIG. 8 as an example, the first downlink transmission time position is subframe 5, and the third downlink transmission time position is determined as subframe 6 or subframe 7 for AN 450/460.

FIG. 11 is a flowchart of a method 1100 used in a radio node according to an embodiment of the present disclosure. The radio node is served by a superior radio node and serves one or more subordinate radio nodes. For example, the radio node may be AN 440, and its superior radio node or serving radio node is AN 430.

At step S1110, the radio node receives a first synchronization signal from the superior radio node. For example, AN 440 receives the first sync signal from AN 430.

At step S1120, the radio node obtains a first downlink transmission time position for the first synchronization signal. For example, AN 440 obtains a first DL transmission time position for the first sync signal, e.g., subframe 5 as shown in FIG. 8 or 9

At step 1130, the radio node determines a third downlink transmission time position for a third synchronization signal to be transmitted from one of the one or more neighboring radio nodes, based on the first downlink transmission time position. For example, AN 440 determines the third DL transmission time position, e.g., subframe 6 or 7 as shown in FIG. 8, based on the first DL transmission time position.

At step S1140, the radio node senses the third synchronization signal based on the third downlink transmission time position.

There is a predetermined interval between the first downlink transmission time position and the second downlink transmission time position, e.g., as shown in FIG. 8 or 9.

FIG. 12 is a schematic block diagram of a radio node 1200 according to an embodiment of the present disclosure. The radio node 1200 is served by a superior radio node and serves one or more subordinate radio nodes. For example, the radio node may be AN 430, its superior radio node or serving radio node is AN 410, and AN 440 is a subordinate radio node of AN 430.

As shown in FIG. 12, the radio node 1200 includes a receiving unit 1210, an obtaining unit 1220, a determining unit 1230, a transmitting unit 1240, and a sensing unit 1250. The sensing unit 1250 is optional, e.g., depending on whether the radio node 1200 needs to access to one neighboring radio node of its superior radio node. For example, if the radio node 1200 acts as a UE serving as a hot spot, i.e., that can serve other UEs, the radio node 1200 may include the sensing unit 1250.

The receiving unit 1210 is configured to receive a first synchronization signal from the superior radio node.

The obtaining unit 1220 is configured to obtain a first downlink transmission time position for the first synchronization signal.

The determining unit 1230 is configured to determine a second downlink transmission time position for a second synchronization signal to be transmitted by the radio node, based on the first downlink transmission time position. There is a first predetermined interval between the first downlink transmission time position and the second downlink transmission time position, as shown in FIG. 7 or 8.

The transmitting unit 1240 is configured to transmit the second synchronization signal via the second downlink transmission time position to the one or more subordinate radio nodes.

Optionally, wherein the determining unit 1230 is further configured to determine a third downlink transmission time position for a third synchronization signal to be transmitted from a neighboring radio node of the superior radio node, based on the first downlink transmission time position. The sensing unit 1250 is configured to sense the third synchronization signal based on the third downlink transmission time position. There is a second predetermined interval between the first downlink transmission time position and the third downlink transmission time position, e.g., as shown in FIG. 8 or 9.

It should be noted that two or more different units in this disclosure may be logically or physically combined. For example, the receiving unit 1210, the transmitting unit 1240, and the optional sensing unit 1250 may be combined as one single unit.

Figure 13:
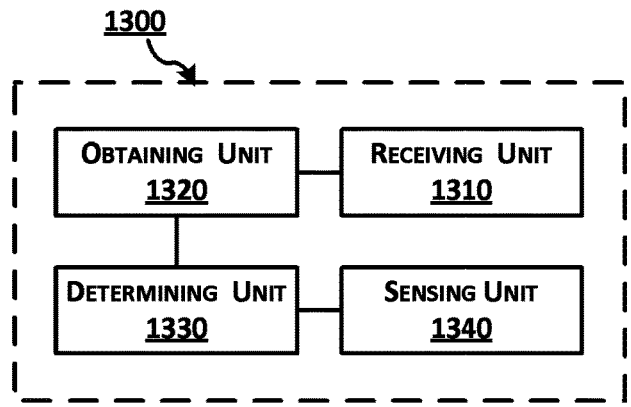
FIG. 13 is a schematic block diagram of a radio node 1300 according to an embodiment of the present disclosure.

FIG. 13 is a schematic block diagram of a radio node 1300 according to an embodiment of the present disclosure. The radio node 1300 is served by a superior radio node and serves one or more subordinate radio nodes. For example, the radio node may be AN 440, and its superior radio node or serving radio node is AN 430.

As shown in FIG. 13, the radio node 1300 includes a receiving unit 1310, an obtaining unit 1320, a determining unit 1330, and a sensing unit 1340. The receiving unit 1310 and the obtaining unit 1320 are of similar functions as the receiving unit 1210 and the obtaining unit 1220 of FIG. 12.

The receiving unit 1310 is configured to receive a first synchronization signal from the superior radio node.

The obtaining unit 1320 is configured to obtain a first downlink transmission time position for the first synchronization signal.

The determining unit 1330 is configured to determine a third downlink transmission time position for a third synchronization signal to be transmitted from one of the one or more neighboring radio nodes, based on the first downlink transmission time position.

The sensing unit 1340 is configured to sense the third synchronization signal based on the third downlink transmission time position. There is a predetermined interval between the first downlink transmission time position and the third downlink transmission time position, as shown in FIG. 8 or 9.

It should be noted that two or more different units in this disclosure may be logically or physically combined. For example, the receiving unit 1310 and the sensing unit 1340 may be combined as one single unit.

Figure 14:
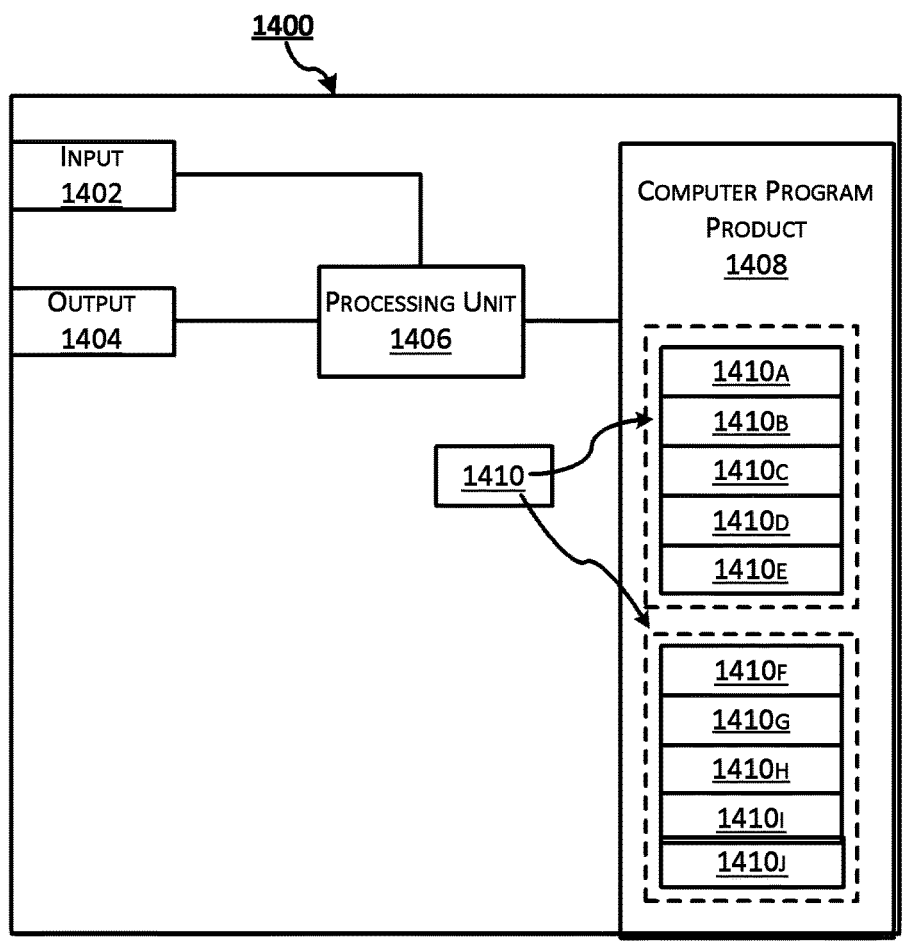
FIG. 14 schematically shows an embodiment of an arrangement 1400 which may be used in the radio node 1200 or the radio node 1300 according to the present disclosure.

FIG. 14 schematically shows an embodiment of an arrangement 1400 which may be used in the radio node 1200 or the radio node 1300 according to the present disclosure.

Comprised in the arrangement 1400 are here a processing unit 1406, e.g., with a Digital Signal Processor (DSP). The processing unit 1406 may be a single unit or a plurality of units to perform different actions of procedures described herein. The arrangement 1400 may also comprise an input unit 1402 for receiving signals from other entities, and an output unit 1404 for providing signal(s) to other entities. The input unit and the output unit may be arranged as an integrated entity or as illustrated in the example of FIG. 12 or FIG. 13.

Furthermore, the arrangement 1400 may comprise at least one computer program product 1408 in the form of a non-volatile or volatile memory, e.g., an Electrically Erasable Programmable Read-Only Memory (EEPROM), a flash memory and a hard drive. The computer program product 1408 comprises a computer program 1410, which comprises code/computer readable instructions, which when executed by the processing unit 1406 in the arrangement 1400 causes the arrangement 1400 and/or the serving radio node or the control node in which it is comprised to perform the actions, e.g., of the procedure described earlier in conjunction with FIG. 10 or FIG. 11.

The computer program 1410 may be configured as a computer program code structured in computer program modules 1410A-1410E, or 1410F-1410J.

Hence, in an exemplifying embodiment when the arrangement 1400 is used in the radio node 1200, the code in the computer program of the arrangement 1400 includes a receiving module 1410A, for receiving a first synchronization signal from the superior radio node. The code in the computer program 1410 further includes an obtaining module 1410B, for obtaining a first downlink transmission time position for the first synchronization signal. Optionally, the code in the computer program 1410 further includes a determining module 1410C, for determining a second downlink transmission time position for a second synchronization signal to be transmitted by the radio node, based on the first downlink transmission time position. Optionally, the code in the computer program 1410 further includes a transmitting module 1410D, for transmitting the second synchronization signal via the second downlink transmission time position to the one or more subordinate radio nodes. The code in the computer program 1410 may comprise further modules, illustrated as module 1410E, e.g. for controlling and performing other related procedures associated with the radio node's operations. For example, when the radio node is a BS/UE, then the module 1410E may control and perform other related procedures associated with the BS/UE's operations.

In another exemplifying embodiment when the arrangement 1400 is used in the radio node 1300, the code in the computer program of the arrangement 1400 includes a receiving module 1410F, for receiving a first synchronization signal from the superior radio node. The code in the computer program further includes an obtaining module 1410G, for obtaining a first downlink transmission time position for the first synchronization signal. The code in the computer program further includes a determining unit 1410H, for determining a third downlink transmission time position for a third synchronization signal to be transmitted from one of the one or more neighboring radio nodes, based on the first downlink transmission time position. The code in the computer program further includes a sensing unit 1410I, for sensing the third synchronization signal based on the third downlink transmission time position. The code in the computer program 1410 may comprise further modules, illustrated as module 1410I, e.g. for controlling and performing other related procedures associated with the radio node's operations. For example, when the serving radio node is a UE, then the module 1410I may control and perform other related procedures associated with the UE's operations.

The computer program modules could essentially perform the actions of the flow illustrated in FIG. 10, to emulate the radio node 1200, or the actions of the flow illustrated in FIG. 11, to emulate the radio node 1300. In other words, when the different computer program modules are executed in the processing unit 1406, they may correspond, e.g., to the units 1210-1240 of FIG. 12, or to the units 1310-1340 of FIG. 13.

Although the code means in the embodiments disclosed above in conjunction with FIG. 14 are implemented as computer program modules which when executed in the processing unit causes the arrangement to perform the actions described above in conjunction with the figures mentioned above, at least one of the code means may in alternative embodiments be implemented at least partly as hardware circuits.

The processor may be a single CPU (Central processing unit), but could also comprise two or more processing units. For example, the processor may include general purpose microprocessors; instruction set processors and/or related chips sets and/or special purpose microprocessors such as Application Specific Integrated Circuit (ASICs). The processor may also comprise board memory for caching purposes. The computer program may be carried by a computer program product connected to the processor. The computer program product may comprise a computer readable medium on which the computer program is stored. For example, the computer program product may be a flash memory, a Random-access memory (RAM), a Read-Only Memory (ROM), or an EEPROM, and the computer program modules described above could in alternative embodiments be distributed on different computer program products in the form of memories within the radio node.

The present disclosure is described above with reference to the embodiments thereof. However, those embodiments are provided just for illustrative purpose, rather than limiting the present disclosure. The scope of the disclosure is defined by the attached claims as well as equivalents thereof. Those skilled in the art can make various alternations and modifications without departing from the scope of the disclosure, which all fall into the scope of the disclosure.

What is claimed is:

1. A method used in a radio node, the method comprising:
receiving a first synchronization signal from a superior radio node that serves the radio node;
obtaining a first downlink transmission time position for the first synchronization signal;
determining, based on the first downlink transmission time position, a second downlink transmission time position for a second synchronization signal to be transmitted by the radio node;
transmitting the second synchronization signal via the second downlink transmission time position to one or more subordinate radio nodes served by the radio node;
determining, based on the first downlink transmission time position, a third downlink transmission time position for a third synchronization signal to be transmitted from a neighboring radio node of the superior radio node; and
sensing the third synchronization signal based on the third downlink transmission time position.

2. The method according to claim 1, wherein determining the second downlink transmission time position is further based on a first predetermined interval between the first downlink transmission time position and the second downlink transmission time position.

3. The method according to claim 1, wherein determining the third downlink transmission time position is further based on a second predetermined interval between the first downlink transmission time position and the third downlink transmission time position.

4. A non-transitory, computer-readable medium storing computer-executable instructions that, when executed by a processing unit of a radio node, configure the radio node to perform operations corresponding to the method of claim 1.

5. A method used in a radio node, the method comprising:
receiving a first synchronization signal from a superior radio node that serves the radio node;
obtaining a first downlink transmission time position for the first synchronization signal;
determining, based on the first downlink transmission time position, a third downlink transmission time position for a third synchronization signal to be transmitted from a neighboring radio node of the superior radio node; and
sensing the third synchronization signal based on the third downlink transmission time position.

6. The method according to claim 5, wherein is determining the third downlink transmission time position is further based on a predetermined interval between the first downlink transmission time position and the third downlink transmission time position.

7. A non-transitory, computer-readable medium storing computer-executable instructions that, when executed by a processing unit of a radio node, configure the radio node to perform operations corresponding to the method of claim 5.

8. A computer arrangement used in a radio node, the computer arrangement comprising:
a processing unit; and
at least one memory storing program instructions that, when executed by the processing unit, configure the radio node to:
receive a first synchronization signal from a superior radio node that serves the radio node;
obtain a first downlink transmission time position for the first synchronization signal;
determine, based on the first downlink transmission time position, a second downlink transmission time position for a second synchronization signal to be transmitted by the radio node;
transmit the second synchronization signal via the second downlink transmission time position to one or more subordinate radio nodes served by the radio node;
determine, based on the first downlink transmission time position, a third downlink transmission time position for a third synchronization signal to be transmitted from a neighboring radio node of the superior radio node; and
sense the third synchronization signal based on the third downlink transmission time position.

9. The computer arrangement according to claim 8, wherein execution of the program instructions further configure the radio node to determine the second downlink transmission time position based on a first predetermined interval between the first downlink transmission time position and the second downlink transmission time position.

10. The computer arrangement according to claim 8, wherein execution of the program instructions further configure the radio node to determine the third downlink transmission time position based on a second predetermined interval between the first downlink transmission time position and the third downlink transmission time position.

11. A radio node comprising the computer arrangement of claim 8.

12. A computer arrangement used in a radio node, the computer arrangement comprising:
a processing unit; and
at least one memory storing program instructions that, when executed by the processing unit, configure the radio node to:
receive a first synchronization signal from a superior radio node that serves the radio node;
obtain a first downlink transmission time position for the first synchronization signal;
determine, based on the first downlink transmission time position, a third downlink transmission time position for a third synchronization signal to be transmitted from a neighboring radio node of the superior radio node; and
sense the third synchronization signal based on the third downlink transmission time position.

13. The arrangement according to claim 12, wherein execution of the program instructions further configure the radio node to determine the third downlink transmission time position based on a predetermined interval between the first downlink transmission time position and the third downlink transmission time position.

14. A radio node comprising the computer arrangement of claim 12.

* * * * *